United States Patent [19]

Blaser

[11] 4,343,279

[45] Aug. 10, 1982

[54] CHARGE FORMING DEVICE FOR INTERNAL COMBUSTION ENGINE

[76] Inventor: Richard F. Blaser, 14416 Innsbruck Ct., Silver Spring, Md. 20906

[21] Appl. No.: 90,683

[22] Filed: Nov. 2, 1979

[51] Int. Cl.³ ............................................ F02M 39/00
[52] U.S. Cl. ................................... 123/445; 123/452; 261/DIG. 68
[58] Field of Search ............... 123/445, 446, 452, 453, 123/457; 261/DIG. 68, 39, 23 A, 78 R

[56] References Cited

U.S. PATENT DOCUMENTS

| | | |
|---|---|---|
| 2,033,211 | 3/1936 | Tice . |
| 2,272,418 | 2/1942 | Mery . |
| 2,860,617 | 11/1958 | Pringham ............................ 123/445 |
| 2,871,841 | 2/1959 | Goodridge et al. . |
| 2,908,488 | 10/1959 | Stewart ............................. 261/23 A |
| 3,060,914 | 10/1962 | Morand . |
| 3,146,764 | 9/1964 | Elsbett . |
| 3,730,160 | 5/1973 | Hughes . |
| 3,738,336 | 6/1973 | Holland ..................... 261/DIG. 68 |
| 3,796,048 | 3/1974 | Annus et al. . |
| 3,843,755 | 10/1974 | Tuckey ..................... 261/DIG. 68 |
| 4,104,989 | 8/1978 | Resler, Jr. . |
| 4,216,753 | 8/1980 | Inoue et al. ........................ 123/455 |
| 4,224,914 | 9/1980 | Knapp ................................ 123/452 |

FOREIGN PATENT DOCUMENTS 2011986 3/1970 Fed. Rep. of Germany ...... 123/445

*Primary Examiner*—P. S. Lall
*Attorney, Agent, or Firm*—Bacon & Thomas

[57] ABSTRACT

A charge forming device for an air breathing internal combustion engine (10) includes main and mixing air manifold (40) (63) for each cylinder (14), a fuel distribution port (62) in each mixing manifold (63) facing towards the intake valve (30) of each cylinder, with the fuel of each charge being supplied solely through the fuel distribution port and entrained, with a proportion of fuel carrier air supplied by a carrier air duct (54) in communication with the fuel distribution port into the main engine air supply flowing through the main and mixing manifolds. The fuel distribution port is large and is shaped to divert expansion waves induced in the charge upstream of the intake valve by the kinetics of the interrupted charge flow out of the mixing manifold and into a temporary holding area, and to allow compression wave flow of fuel-free air from the main manifold towards the intake valve so that fuel-free air accumulates near the intake valve between engine intake events.

18 Claims, 12 Drawing Figures

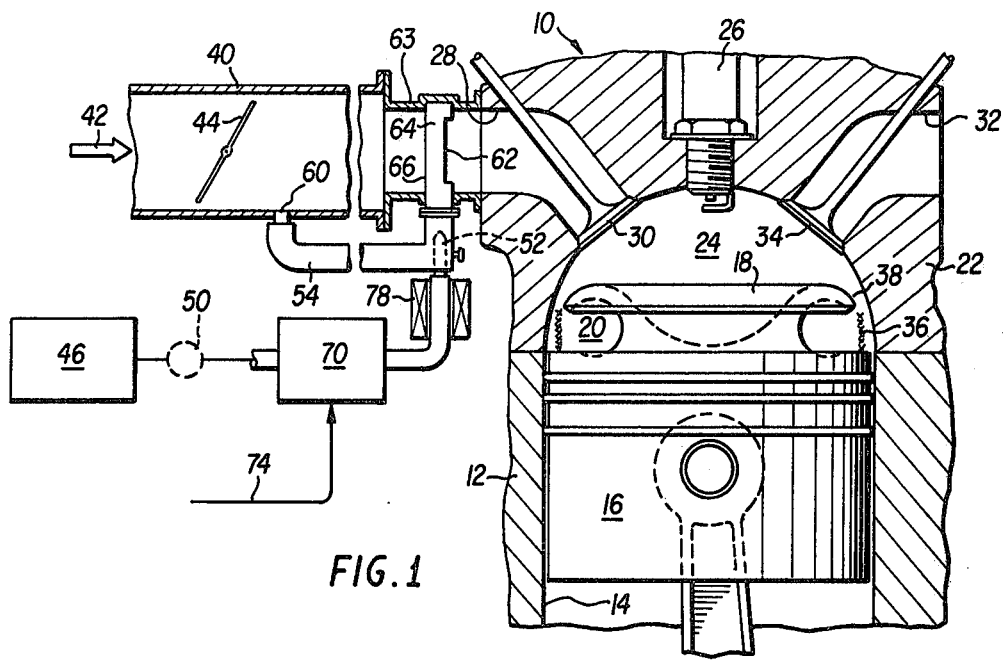
FIG. 1
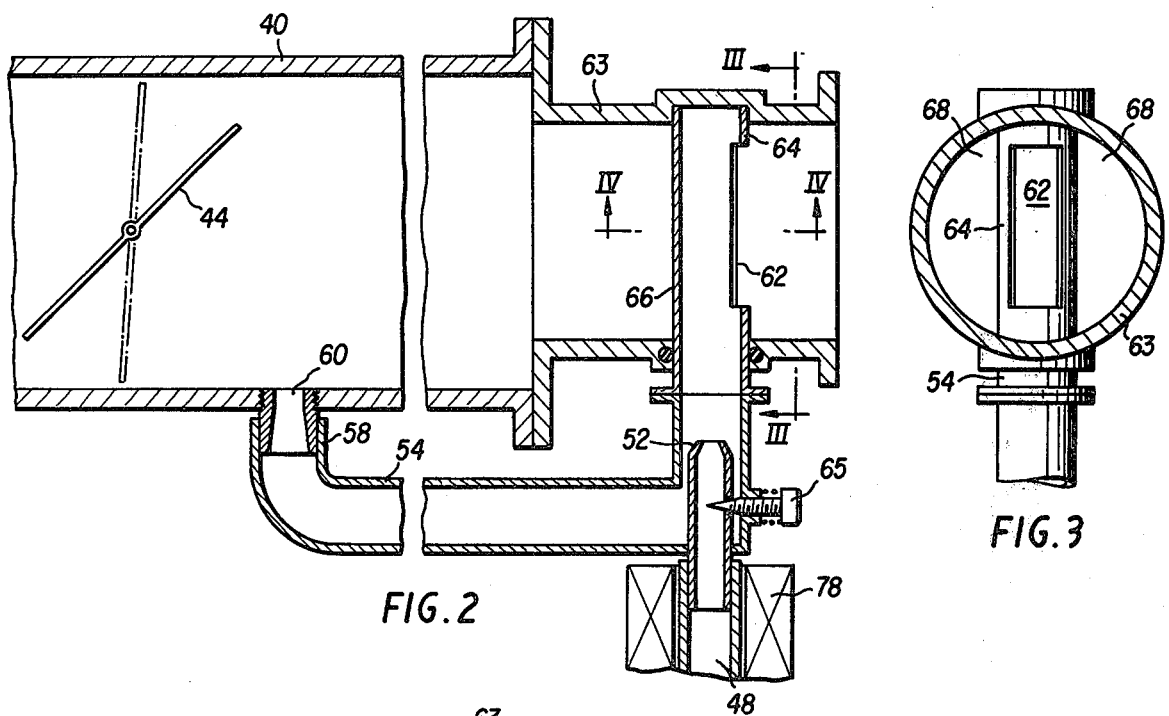
FIG. 2
FIG. 3
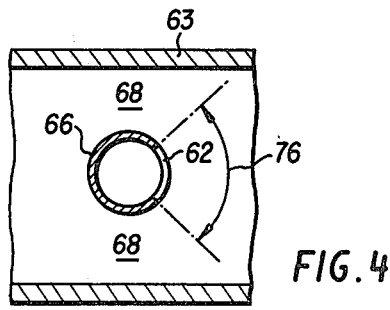
FIG. 4 a) INTAKE b) INTAKE/COMP c) INTAKE/COMP/EXP d) INTAKE

CHARGE FORMING DEVICE FOR INTERNAL COMBUSTION ENGINE

BACKGROUND OF THE INVENTION

1. Field of the Invention

This invention relates to a charge forming device for piston type internal combustion engines designed to be supplied with fuel carried in an intake air stream.

2. Problem to be Solved and Discussion of Prior Art

The problem solved by the present invention is that of providing, in an internal combustion engine that receives a fuel and air charge through a charge intake port, substantially fuel-free air at the intake valve at the moment the intake valve is opened during an intake event while yet providing a total charge of fuel and air for each intake that meets the requirement of the power cycle of the engine. The initial fuel-free air is desired to enable proper distribution of air and fuel within the working chamber of the engine in a manner that will be evident from the description that follows.

Various prior art exists illustrating the use of valve arrangements for injecting auxiliary air into the intake manifold or port area of an internal combustion engine to provide auxiliary air intended to solve specific problems. U.S. Pat. No. 3,561,412 is an example of such prior art. However, the specific problem of providing fuel-free air to a cylinder at the beginning of an intake event by regulating the timed charge of the required fuel between intake events upstream of the intake port does not seem to have been considered in such prior art.

SUMMARY OF THE INVENTION

The present invention forms and supplies a fuel-free, or substantially fuel-free charge (outside flammability limits) to an internal combustion engine cylinder during each intake event or stroke, while providing a total charge that contains sufficient fuel to satisfy the output demand of the engine. This is achieved without using mechanically moving parts, but rather by using the kinetics of the air flow that acts as the fuel carrier. The air flow kinetics are utilized to generate the timing requisites of the fuel supply to the engine so that the initial charge intake into the cylinder is fuel-free, while the total fuel content of the charge fulfills the operative requirements of the engine. Fuel quantity alone is regulated by an external control so that it is supplied in proportion to the power demand of the engine.

The charge former is particularly adapted to meet the requirements of an energy conversion cycle and an engine for carrying out such a cycle that constitute related inventions of the inventor of the present invention. In such a cycle, it is necessary to obtain a distribution of the charge whereby the initial portion of the charge drawn into or admitted into the cylinder is substantially fuel-free while the remainder of the charge contains virtually all of the fuel needed for the expected operative output of the engine. The internal configuration of such an engine and the timing of the supply of the fuel portion of the charge during charge intake enable the distribution of the charge within the combustion chamber area so that essentially air alone is distributed to a sustaining air chamber or chambers arranged to be conveniently in communication with the combustion chamber. The air chamber is separated from the combustion chamber by gap areas and "partition" volumes that are specifically designed to control availability of activated oxygen to the combustion zone during each energy conversion cycle. The fuel containing portion of the charge drawn into the cylinder at the end of each intake stroke is concentrated within a somewhat restricted combustion zone to optimize the potential rate of reaction for the particular fuel being utilized and contains fuel in sufficient quantity to meet the operational requirements of the particular engine involved. A further general discussion and a description of the energy conversion cycle is presented in the detailed description that follows.

The present invention provides fuel-free air at the intake port of the engine at the moment the intake valve opens (after the first intake event has occurred) to begin the intake part of the operational cycle of the engine by utilizing the kinetics of the air stream moving through the charge intake manifold system, particularly the response of the moving stream to sudden closure of the intake valve at the end of each intake event within the engine. Specifically, the cyclic pressure and expansion waves or oscillations that occur just upstream of the intake valve of the engine when the intake valve closes are utilized in cooperation with a shaped fuel distribution port located in a special section of intake manifold located just upstream of the intake port, whereby the periodic forward and reverse flows induced by the pressure and expansion waves in the special manifold cause the fuel containing part of each charge trapped upstream of the intake valve to be leaned out to the extent that substantially fuel-free air is substituted for the fuel containing portion of the charge between intake valve openings.

In effect, when the intake valve closes following a previous intake event, the trapped portion of the charge just upstream of the intake valve is diverted out to the special manifold section while it expands upstream of the intake port, and fuel-free air is substituted for the diverted portion of the charge in the vicinity of the intake port during the compression phase of the charge that follows the expansion wave. The specific manner in which this is carried out will be better understood from the following description of specific embodiments of the invention.

DETAILED DESCRIPTION OF THE INVENTION

Description of the Drawings

FIG. 1 is a partly sectional view schematically illustrating the invention as embodied in a reciprocating piston engine utilizing fuel supplied by a carrier air stream;

FIG. 2 is an enlarged sectional view of part of the intake manifold system and fuel distribution control system shown in FIG. 1;

FIG. 3 is a detailed view taken along the line III—III of FIG. 2;

FIG. 4 is a detailed view as taken along line IV—IV in FIG. 2;

DETAILED TECHNICAL DESCRIPTION

Figure 5A:
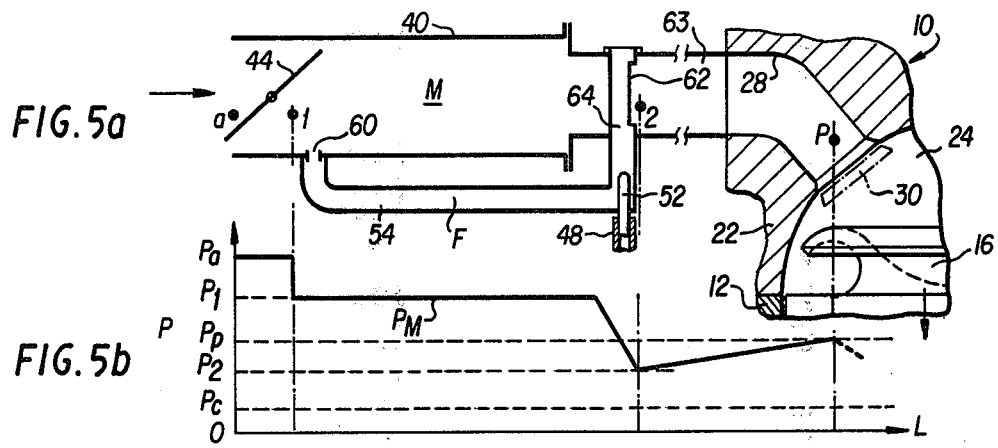
FIGS. 5A–5C respectively show diagrammatically the intake manifold system and fuel distribution layout of FIG. 1, the pressure distributions along the manifold, and the velocity profile along same.

With reference to FIG. 1 in the drawings, an air breathing, reciprocating piston, internal combustion engine is generally designated at 10 in schematic form and includes an engine block 12 within which is bored a cylinder 14 for receiving a power piston 16 having a working face 18 and a sustaining air reservoir chamber 20. The engine includes a head 22 machined to provide an inner chamber 24 which, with the working face 18 of the piston and the cylinder 14, defines a variable volume working chamber 24 of the engine within which fuel and air are chemically reacted rapidly in a process conventionally termed "combustion" to liberate work producing heat during each power cycle of the engine. The sustaining air chamber 20 is shown provided in the upper end of the piston below the working face 18 of same and is isolated from the working chamber 24 by a "partition volume" 36 that is represented by an area across a variable gap 38 projected downwardly towards the bottom of the chamber 20. The gap 38, the volume 36, the contours of the surfaces defining the working chamber 24, the sustaining chamber 20, and the distribution of fuel in the working and sustaining chambers all are designed to control the availability of activated oxygen molecules within the working chamber 24 during "combustion" of each charge. The specific manner in which this is accomplished forms part of a related invention and is not claimed herein.

Supply of fuel and air occurs through intake port 28 when intake valve 30 is open, and discharge of reaction products is out through exhaust port 32 when the exhaust valve 34 is opened.

It is desired, when operating an engine of the type described, to draw in essentially only air through the intake port 28 at the beginning of each charge intake event, followed by the fuel containing portion of the charge. This permits air to be stored and activated in the sustaining air chamber 20 during intake and compression of the charge and provides a mixture rich in fuel within the working chamber volume 24 at the moment of "ignition" of the charge. A problem, of course, occurs in an engine arrangement wherein fuel is supplied in a carrier air stream moving through the intake port as distinguished from being directly injected into the combustion zone or the intake port area. In typical arrangements of this type engine, each intake stroke produces a drop in intake manifold pressure that produces a flow velocity that is used to induce a suction pressure across a venturi restriction that serves as a pressure differential for fuel into the flowing air stream, or the charge mixture is pressurized (supercharged) upstream of the intake port before the fuel is added to the moving air stream. Such systems provide a homogeneous mixture charge composition and do not normally provide suitable control over the timing of fuel supply during each intake event since the fuel in the charge remaining in the intake port area from the previous intake event is immediately drawn into or supplied to the cylinder during the succeeding intake event. Thus while gross timing of fuel supply during the intake can readily be achieved, there has not been a way provided to remove the fuel in the air.

It has been demonstrated that each sudden closure of an intake valve in an air breathing engine generates a series of compression and expansion waves in the air stream upstream of the intake valve due to the change in momentum of the gaseous particles moving towards the valve. In this invention, this phenomenon, resulting from the kinetics of the air flow, is utilized to cause a leaning out of the air upstream of the intake valve during the brief time span between sequential openings of the intake valve whereby each intake of fresh charge into the cylinder after the first intake event results in the initial intake of fuel-free or substantially fuel free air into the cylinder, followed by the supply of fuel to the intake stream during the remainder of the intake event. How this occurs and the manner in which the timing and metering of the fuel supply is carried will be evident from the following discussion respecting the preferred embodiment.

Referring again to FIG. 1, air is supplied to a main air intake manifold 40 of engine 10 in the direction of arrow 42 during each intake stroke of piston 16, in a generally conventional manner, except that an air throttle plate 44 is used to modulate air flow through the main manifold during low power demand operating conditions, but otherwise air is permitted to flow fully through the main manifold in response to engine air flow demand. The throttle plate 44, of course, is operated by a suitable mechanism, not illustrated.

Fuel from a source 46 is drawn by aspiration, in a manner to be described below, through fuel line 48, or may be supplied under pressure of a transfer fuel pump 50. Fuel pump 50 may also be a high pressure pump, depending upon the nature of the metering of the fuel supply. The fuel line 48 terminates at a fuel supply nozzle 52 (see FIG. 2) located in an air carrier duct 54 that supplies fuel carrying air drawn from main manifold 40 through a restriction orifice 60 located just downstream of the throttle plate 44. The conduit 54 at its other end communicates with a fuel distribution port 62 and manifold 63 hereinafter referred to as a mixing manifold (manifolds 40 and 63 together form the intake manifold system of the engine) through which the fuel and carrier air is drawn into the primary air flowing through main air intake manifold 40 during each engine intake stroke. The main manifold 40 is larger in diameter than the mixing manifold 63 and joins the latter just upstream of the fuel distribution port 62. Mixing manifold 63 is as short as possible considering its structural requirements, so that distribution port 62 is as close to intake port 28 as possible. An idle bleed screw 65 provides an idle air adjustment for the fuel supply nozzle 52 to insure necessary percolation of the fuel when the suction forces through duct 54 are low.

Fuel distribution port 62 in mixing manifold 63 comprises a downstreams intake port facing orifice in an extension 64 of the air carrier duct 56, the extension 64 traversing the mixing manifold 63. The outer surface 66 of extension 64 is closed except for port 62, and occupies a substantial portion of the cross-sectional area of the mixing manifold 63, as illustrated in FIGS. 3 and 4. Thus, during charge intake, air flow through the restriction 68 around the extension 64 is accelerated and a pressure drop occurs due to the venturi effect in the vicinity of the port 62. The pressure drop due to the venturi effect is used to draw fuel and fuel carrier air out of port 62 into the accelerated air stream flowing towards intake port 28 where it is internally mixed therewith in suitable proportion determined by a fuel metering and control means 70 that regulates the quantity of fuel during each intake event to insure sufficient fuel in each charge to meet the power demand of the engine. The fuel metering means 70 meters fuel through the fuel line 48 into the carrier duct 54 from where it is drawn into the mixing manifold 63 due to the pressure gradient between port 62, duct 54, and restriction 60. The fuel metering means 70 is controlled by any suitable control system having, for example, mechanical, electrical or hydraulic input signal means 74 operable in response to various desired input controls, sensors or engine operating parameters, including electronic data processing means, not illustrated. The specific form of metering means 70 does not constitute part of this invention, and systems for accomplishing this function can readily be obtained commercially or are within the purview of the state of the art. The fuel metering means, however, must be capable of metering fuel flow in any appropriate manner that satisfys the power demand of the engine. The timing of the fuel flow, of course, would be determined by the air flow kinetics in the mixing manifold 63.

The port 62 as illustrated in FIGS. 3 and 4, extends over an angle 76 that is sufficient to cause the port to extend across a major portion of the projected area of extension 64 in the manifold 63. The opening of the port 62 is larger than the internal cross-sectional area of the duct 56 and the extension 64.

A fuel preheater 78 is also preferably provided, such preheater heating the liquid fuel as required, and may be electrical, as shown, or arranged to use waste heat (coolant, exhaust, etc.) from the engine 10.

Figure 5B:
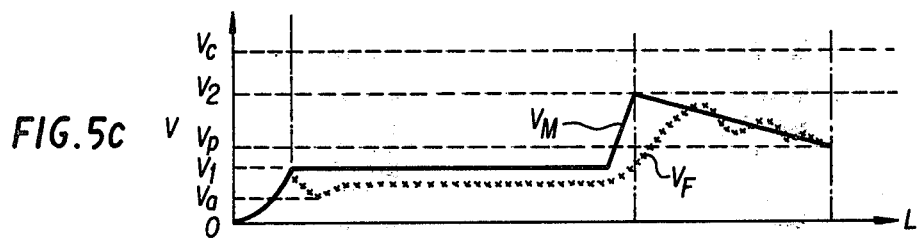
Figure 5C:
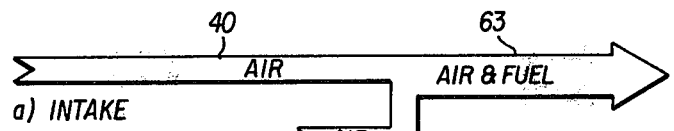

The operation is as follows. As shown in FIGS. 5A–5C, the pressure and velocity profile along the manifold system M (this is the same as manifolds 40 and 63 in FIG. 1) at points 1 (throttle plate), 2 (venturi area) and p (inlet port area) is in accordance with generally accepted principles of fluid dynamics. The pressure and velocity profiles illustrated are depicted for a single intake event of the engine 10. Pressure drop across the air throttle plate 44 and around the extension 64 as shown in FIG. 5B create velocity accelerations as shown in FIG. 5C. In FIG. 5C, the velocity $V_m$ is the velocity of gasses through the manifolds 40 and 63 and $V_F$ is the velocity through the carrier duct 56.

Figure 6A:
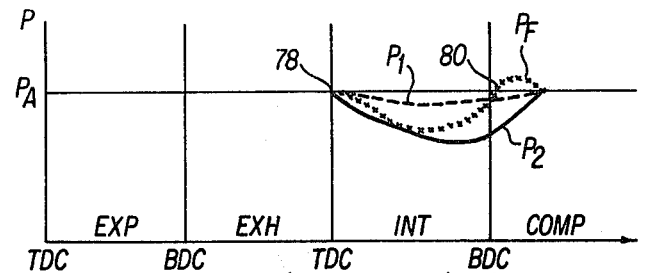
FIGS. 6A–6C respectively show graphs of pressure and velocity profiles in the intake manifolds plotted against time during engine cycle events.

In FIG. 6A, pressures in manifolds 40 and 63 at points 1 ($P_1$) and 2 ($P_2$) and the pressure in carrier air duct ($P_F$) are plotted against time during an intake and compression event of a power cycle. The expressions "BDC" and "TDC" mean, respectively, "bottom dead center" and "top dead center," and refer to bottom and top piston positions when the working chamber is at maximum and minimum volumes. It is assumed for simplicity that the intake valve opens at 78 and closes at 80.

Figure 6B:
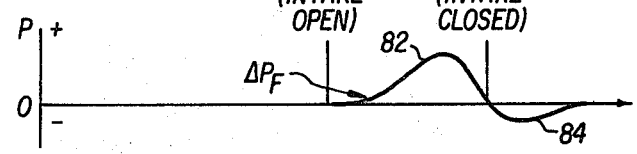
Figure 6C:
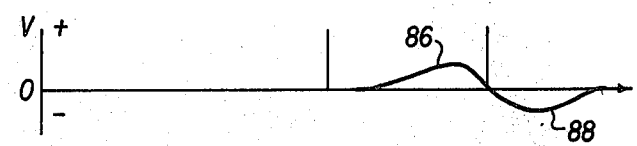

In FIG. 6B, the net suction force $\Delta P_1$ acting on the fuel distribution port 62 as a result of kinetics of air flow passing through main and mixing manifolds 40 and 63, including pressure waves induced in the manifolds by valve closings, is depicted. It will be observed that upon intake valve opening, a net positive pressure differential builds up to draw fuel and carrier air into the mixing manifold 63 through port 62 in direct timed relationship with the intake event. As the intake valve closes, the "positive" pressure differential that previously was available to draw fuel into mixing manifold 63 drops to zero, as the velocity of the incoming charge is reduced suddenly, and the influence of the momentum compression of the charge against the closed intake valve is propagated upstream beyond the intake port 28 to generate a "negative" pressure differential across port 62, the "negative" pressure differential denoting that the pressure at port 62 is higher than that within the carrier duct 54 so that flow of charge proceeds (or is diverted) back into port 62 from mixing manifold 63. The part of the expansion wave that moves upstream past the extension 64 expands within the larger main manifold 40 and is totally dissipated in the main manifold so that it is not propagated beyond the plate 44. In actuality, the upstream expansion wave is followed rapidly by a compression wave in a downstream direction towards the intake port 28, and the cycle repeats several times between valve closings. The pressure and velocity gradients are induced by the naturally occurring kinetics of the gas flow through the intake port area of the operating engine, as will become more clear from the discussion that follows.

Figure 7:
FIGS. 7A–7D respectively illustrate the direction and relative flow velocities of air and fuel through the intake manifold system and fuel distribution control system shown in FIG. 1.
Figure 7:
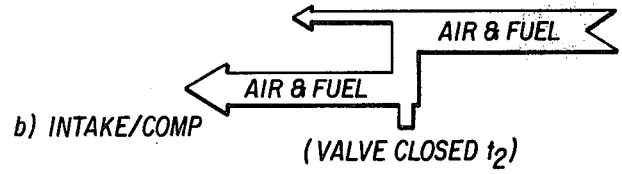
Figure 7:
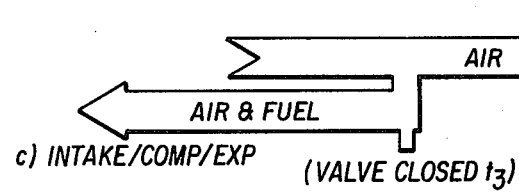
Figure 7:
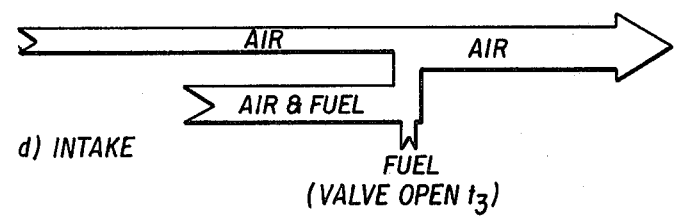

The net result of both the positive and the negative pressure gradients and velocity flows is depicted in FIGS. 7A–7D. In FIG. 7A, assuming the engine 10 has operated through at least one cycle so that fuel and air are present in mixing manifold 63 near inlet port 28, and further assuming that the time is at $t_1$ which is after an initial intake event, the primary air is flowing through main manifold 40 and mixing manifold 63, and mixes with fuel and carrier air at the area of port 62 due to the venturi effect of air flowing through the mixing manifold around the extension 64. This provides desired charge distribution to the working chamber 24 of the engine, which chamber is expanding during a suction stroke. Fuel in proper amount flows through fuel line 48 into carrier duct 54 through which carrier air is being drawn through restriction from main manifold 40.

In FIG. 7D, the intake valve has just closed at time $t_2$ at the end of the respective intake vent and the start of the next compression phase. The sudden build-up of pressure at the intake valve has occurred and the expansion effect is now shown to be in progress. Air and fuel in the intake port area downstream of the port 62 and upstream of the intake valve 30 expand upstream in the mixing manifold and encounter the venturi restriction area 68, the extension 64 and the open port 62. Because of the geometry of these elements, the expanding gases are directed (i.e., diverted) upstream into the open port 62, down the duct 54 and into the carrier air supply conduit. Because of the restriction 60 and since the conduit 54 will be properly sized to achieve the effect, the small negative effect of the forward momentum of carrier air and fuel in the duct 54 is minimized so that upstream flow of air and fuel from manifold 63 into the duct 54 is not impeded. The large cross-sectional area of port 62 as compared to the cross-sectional area diversion of most of the upstream flow from manifold 63 through port 62 and into duct 54. The larger size of main manifold 40 also insures that the upstream pressure wave is contained between port 62 and the air inlet area of manifold 40.

The upstream expansion phase then ends and is followed by a downstream compression wave illustrated in FIG. 7C. This drives pure air through the venturi restriction 68 since very little of the fuel and air portion of the previous charge has been allowed to flow upstream past the port 62 in manifold 63. While the intake valve 30 remains closed and without fuel supply from fuel line 48, only substantially fuel-free air is available to expand back from the manifold 40 upstream of the port 62 into the area of the intake port and intake valve. The sizes of duct 54 and restriction 60 are carefully selected to "tune" the system so that the air and fuel remains contained in conduit 54 as shown while fuel-free air flows towards the intake port from main manifold 40.

By the time the intake valve opens, a series of compression and expansion waves has usually occurred and these have strongly favored the accumulation of substantially fuel-free air near the intake valve. In the context of this invention "fuel-free" air means air having negligible fuel content. Opening of the intake valve at time $t_4$ as shown in FIG. 7D to start the next intake event results in the drawing of the fuel-free air to produce part of the charge distribution function referred to at the introduction of this description. Fuel is then admitted through fuel line 48 at the proper moment or may be allowed to flow by aspiration under the influence of full forward air flow through the manifolds 40 and 63. The process is repeated, of course, for each cycle of operation.

Various considerations will likely need to be taken into account in any practical application of the invention in a real engine. Generally, the air is allowed to flow freely through manifold 40 except when power demand is below about one-third of full power, when the air throttle plate is used to limit air flow. Restriction of the air flow between the area of port 62 and intake port 28 must usually be avoided. The fuel can be metered by a carburetor or a low pressure injector, or high pressure injector, or any suitable means that will insure a proper quantity of fuel supply in relation to expected engine power output. Preheating of the fuel is governed by fuel characteristics and is preferred due to the short time available for fuel vaporization. The cross-section area of the mixing manifold should be about one and one-half times the intake valve open area at maximum valve opening. The cross-sectional area of main manifold 40 should be 1.25–2 times the cross-sectional area of the mixing manifold 63. The internal cross-sectional area of manifold 63 should be about one and one-quarter to two times the cross-section area of the extension 64 of duct 54 measured across its outer diameter. The opening of port 62 should be larger in cross-section than the internal cross-section area of extension 64 and duct 54. The open area of restriction 60 should be in the order of one-third or so the internal cross-section area of conduit 54, although some "tuning" will be required for specific installations. The final dimensions of mixing manifold 63, manifold 40, conduit 56 and duct 54 will usually be "tuned" to particular engine configurations in accordance with well-known principles of gas dynamics to properly entrain the pressure oscillations induced in the manifolds 63 and 40. The effective flat plate area of extension 66 should be about one-half or less the internal cross-sectional area of manifold 63 so that venturi areas 68 are not too small. The open area of distribution port 62 should be in the order of seventy-five percent of the effective flat plate area of extension 66.

The distances between the port 62 and intake valve 30 in all situations must be the minimum possible for each engine configuration, so that the port 62 will always be subjected to the compression and expansion waves resulting from the kinetics of air flow through the intake port.

The invention has application to two-stroke engines where the kinetics result from the exhaust gas flow and the positive pressure differences supplied by the compression of the charge or by mechanical superchargers. The fuel-free condition of the initial intake gas improves the scavenging action of the exhaust because the exhaust gases are not contaminated with fuel.

Figure 8:
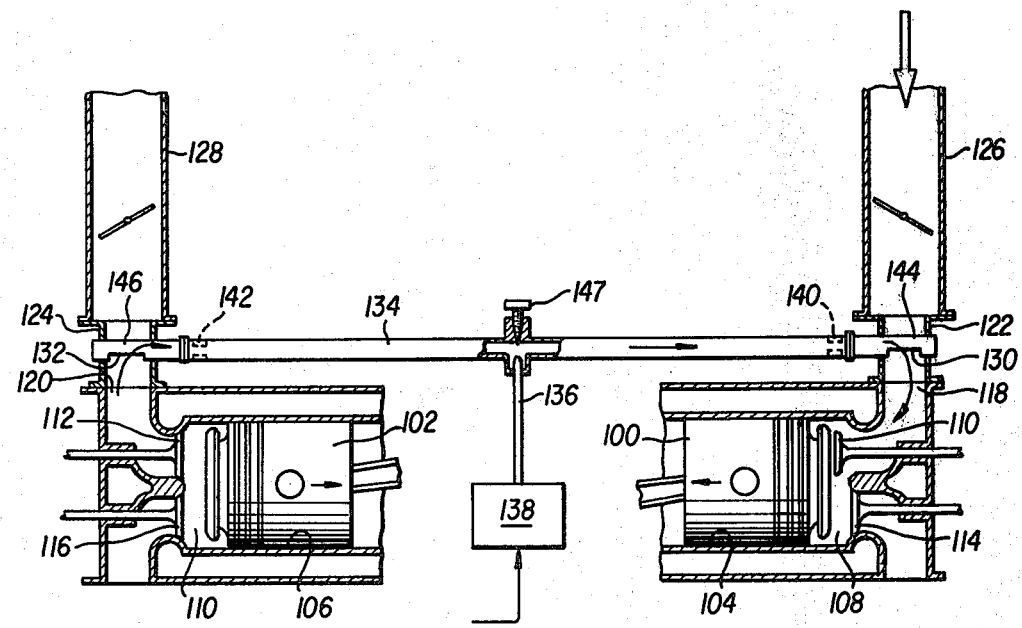
FIG. 8 shows a special application of the invention adapted for cylinder pairs operating in opposed timing relationship.

A special application of the invention is shown in FIG. 8, wherein a pair of pistons 100, 102 similar to piston 16 in FIG. 1 are illustrated. Piston pairs 100, 102 are assumed to operate in opposed timed relationship (180° out of phase for two stroke cycle; 360° out of phase for a four stroke cycle). The pistons 100, 102 reciprocates in respective cylinders 104, 106 that are provided with variable volume working chambers 108, 110 having intake valves 110, 112, exhaust valves 114, 226, and intake ports 118, 120. Mixing manifolds 122, 124 are also provided, the latter being placed between main manifolds 126, 128. Each mixing manifold 122, 124 is provided with a fuel distribution port 130, 132 facing intake ports 118, 120, respectively, and within the area subjected to intake gas flow kinetics, similar to the FIG. 1 arrangement. The principal departure of the FIG. 8 arrangement from that shown in FIG. 1 lies in the use of a common carrier air duct 134 and central fuel supply line 136 through which all fuel for both working chambers 108, 110 is supplied. Fuel quantity is controlled by fuel controller 138 in line 136. A restriction 140, 142 is placed in each end of the carrier air duct 134 near its intersection with its respective extension 144, 146. Bleeder air control 147 enables control over supply of idle air.

In operation, it will be seen that the system of FIG. 1 is somewhat simplified by eliminating the need for a separate fuel metering controller for each cylinder, since each controller 138 can serve a pair of cylinders. Moreover, the intake event in one cylinder permits further scavenging of fuel from the area of the intake port of the opposed cylinder, as shown, for example, by the arrows in FIG. 8, where the working chamber 108 on the right is expanding during an intake event. Thus, the carrier air supplied to one distribution port is supplied from the mixing manifold area of the other intake manifold system through the respective fuel distribution ports.

The specific embodiments of the invention described above are intended to be exemplary and not in any way are intended to limit the spirit and scope of the invention beyond what is claimed below.

What is claimed is:

1. In a charge forming device for an air breathing internal combustion engine including at least one variable working chamber, an intake manifold system for supplying individual air and fuel charges to an intake port of each working chamber, the manifold system including an air throttle device; and a periodically opening and closing intake valve for controlling the flow of air and fuel charge through the intake port, the improvement comprising:
    a. a fuel distribution port in the intake manifold system facing towards and located closely adjacent the intake port and through which all of the fuel portion of each charge flows;
    b. a venturi restriction in the intake manifold system adjacent the fuel distribution port and through which substantially all of the air portion of each charge flows to induce suction of fuel through the fuel distribution port during each engine intake event;
    c. said fuel distribution port being disposed within the intake manifold system whereat it is subjected to the compression and expansion waves naturally induced in the charge adjacent to and upstream of the intake valve as a result of the closing of the intake valve at the completion of each charge intake event;

d. a carrier air duct in communication with said fuel distribution port, said carrier air duct communicating with said intake manifold system through a fluid restriction located upstream of said fuel distribution port location and downstream of said air throttle device; and e. means enabling supply of the fuel portion of each charge for entrainment in said carrier air before the fuel is delivered through said fuel distribution port.

2. Apparatus as claimed in claim 1, including at least a pair of said variable volume working chambers, said chambers operating in opposed timing relationship, said fuel distribution port and venturi system being disposed in each manifold system, said carrier air duct connecting both fuel distribution ports to each other, and means for admitting fuel into the carrier air duct centrally between said fuel distribution ports.

3. Apparatus as claimed in claim 2, each intake manifold system including a main air manifold and a mixing manifold, each main air manifold being larger in cross-section than and in communication with each mixing manifold, each mixing manifold located between each main air manifold and the intake port of each working chamber, each fuel distribution port and venturi system being disposed in a respective mixing manifold.

4. Apparatus as claimed in claim 3, including flow restrictions in said carrier air duct located between said central means for admitting fuel and each fuel distribution port.

5. Apparatus as claimed in claim 1, said intake manifold system including a main air manifold and a mixing manifold, said main air manifold being larger in cross-section than, and in communication with, said mixing manifold, said mixing manifold located between said main air manifold and said intake port, said fuel distribution port being disposed in said mixing manifold closely adjacent said intake port.

6. Apparatus as claimed in claim 5, said mixing manifold extending directly to said intake port and being unrestricted between said fuel distribution port and said intake port; said mixing manifold having an internal cross-sectional area about one and one-half times the intake valve open area at maximum aperture.

7. Apparatus as claimed in claim 6, the inner cross-sectional area of said mixing manifold being one and one-half to two times the outer cross-sectional area of said extension.

8. Apparatus as claimed in claim 5, said main manifold being 1.25 to 2 times the cross-sectional area of said mixing manifold.

9. Apparatus as claimed in claim 5, including an intake valve opening area, and wherein the internal crosssectional area of said mixing manifold is approximately one and one-half times the intake valve opening area.

10. Apparatus as claimed in claim 1, said fuel distribution port being disposed in an extension of said carrier air duct, said extension extending into the flow area within said intake manifold system, said fuel distribution port comprising a cutout in the side wall of said extension.

11. Apparatus as claimed in claim 10, said fuel distribution port occupying more than one-half of the effective total flat plate area presented by said extension to the air flowing through said manifold system.

12. Apparatus as claimed in claim 10, said venturi restriction comprising by restricted flow area located between said extension and the intake manifold system interior walls.

13. Apparatus as claimed in claim 10, said extension and intake manifold system each comprising tubular members having circular inner cross-sections.

14. A method of forming a charge for each individual working chamber of a piston type, air breathing internal combustion engine, wherein each working chamber is provided with its own intake port and a periodically closing and opening intake valve for controlling intake of charge into the respective working chamber, and wherein it is desired to form a substantially fuel-free initial part of each charge between valve openings, comprising a. supplying substantially all of the air portion of each charge to each working chamber through an individual intake manifold system in communication with each intake port;

b. supplying all the fuel portion of each charge through a fuel distribution port located in each intake manifold near to and facing toward the respective intake valve;

c. intaking a charge into and closing the respective intake valve rapidly to cause a momentum compression of the flowing charge adjacent the intake valve in the respective intake manifold system;

d. directing a portion of each charge disposed between the respective fuel distribution port and the respective intake valve upstream back into the respective fuel distribution port by using only the natural expansion wave induced in the respective charge portion by the rapid closing of the intake valve; and e. making up the respective portion of the charge directed into the fuel distribution port with fuel-free air between intake valve openings.

15. The method as claimed in claim 14, including entraining the fuel of each charge in a carrier air stream supplied to each fuel distribution port.

16. The method as claimed in claim 15, including storing a portion of each respective charge directed into said fuel distribution port from the intake manifold system and thereafter supplying the same respective charge portion into the combustion chamber during a subsequent intake event through the same fuel distribution port.

17. The method as claimed in claim 15, including controlling the quantity of fuel as a function of required engine power output while allowing full or substantially full flow of air to the engine.

18. The method as claimed in claim 15, wherein the engine includes at least a pair of said working chambers operating in opposed timing relationship, including supplying said carrier air stream to the fuel distribution port of the respective manifold system supplying each working chamber from the intake manifold system of the other working chamber, including drawing said carrier air through the fuel distribution port of the intake system of said other working chamber, and further including supplying fuel and carrier air for both intake manifold systems by means of a common duct to which the fuel is centrally supplied.

* * * * *